March 8, 1955

D. EDMUNDSON ET AL 2,703,876

ELECTRICAL APPARATUS FOR THE INTEGRATION
OF VARIABLE INSTANTANEOUS MEASUREMENTS

Filed Sept. 25, 1952

Inventors:
David Edmundson,
Eric A. Hall,
by Russell A. Warner.
Their Attorney.

2,703,876

ELECTRICAL APPARATUS FOR THE INTEGRATION OF VARIABLE INSTANTANEOUS MEASUREMENTS

David Edmundson and Eric A. Hall, Rugby, England, assignors to The British Thomson-Houston Company Limited, a British company Application September 25, 1952, Serial No. 311,458

3 Claims. (Cl. 340—178)

Our invention relates to electrical apparatus for the integration of a variable quantity from continuous instantaneous measurements thereof, and to a unique variable measurement condenser employed in such apparatus. One example of the use of our invention is for measuring the instantaneous rate of flow of a fluid in a conduit and obtaining from such measurement the total flow during a given period of time.

In carrying our invention into effect, we make use of a U tube which is sensitive to a pressure differential for measuring instantaneous values of a variable quantity and which at the same time serves as a variable condenser signal transmitter of such measurement. The capacitance of the variable condenser is continuously sampled by its charge and discharge, either the charging current or the discharge current controlling a galvanometer which, in turn, controls the frequency of an oscillator and the frequency at which the condenser is charged and discharged such that the frequency is maintained proportional to the variable quantity and inversely proportional to the capacity of the variable condenser. The integration of the variable quantity may then be accomplished by integrating the frequency of the oscillator as by a small synchronous motor-driven counter.

Figure 1:
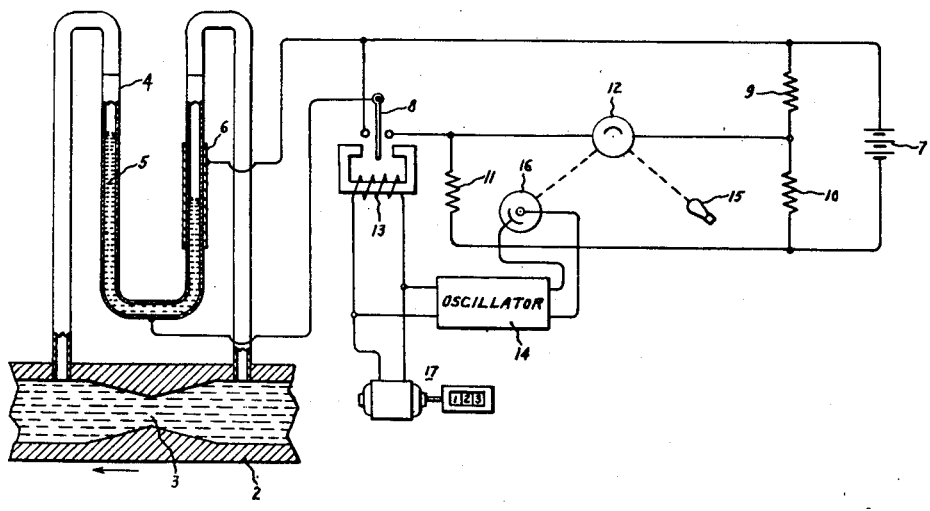
Figure 2:
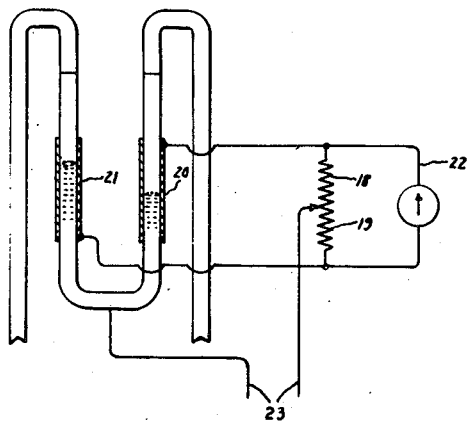

The features of our invention which are believed to be novel and patentable will be pointed out in the claims appended hereto. For a better understanding of our invention reference is made in the following description to the accompanying drawing in which:

Fig. 1 represents apparatus embodying our invention for measuring and integrating the flow of a liquid in a pipe; and, Fig. 2 represents a combined pressure sensitive U tube and a differential variable condenser arrangement.

Referring to Fig. 1, at 2 there is represented a conduit or pipe in which a liquid flows in the direction of the arrow. A restriction orifice 3 in the pipe creates a difference in pressure which is proportional to the square of the velocity of flow through the orifice. This pressure difference is conveyed to a U tube 4 containing mercury 5, and the pressure difference creates a difference in level of the mercury in the two limbs of the U tube. If the U tube is transparent, the instantaneous pressure difference can be observed directly. Also, it may be used to vary an impedance as a telemeter transmitter. For our purposes the U tube is made of insulating material such as glass or plastic, and its walls are made as thin as practicable so as to serve as the dielectric of a condenser of which the mercury within the tube constitutes one plate. Closely surrounding the high pressure tube over the region where the mercury level varies, is a metal coating or shell 6 constituting the other plate of the condenser. It is now evident that the mercury column within the coated portion constitutes the variable plate, the insulating tube the dielectric, and the outer coating the fixed plate of a variable condenser, the capacitance of which varies inversely with the square of the velocity of the liquid flowing in conduit 3. The device thus serves the double purpose of measuring the pressure difference and as an electrical transmitter of such measurement.

In Fig. 1 the condenser thus formed is arranged to be charged from a direct current source 7 when a switch 8 is closed to the right. The condenser is discharged when the switch 8 is closed to the left. The source 7 and U tube condenser are associated with a four-arm impedance bridge circuit during the condenser charging operation when switch 8 is closed to the right. Three arms of the bridge comprise resistances 9, 10 and 11, and the fourth arm comprises the U tube condenser. Two opposite terminals of the bridge are supplied from source 7, and a galvanometer 12 is connected across the other two terminals of the bridge. The switch contact 8 is the movable element of a high-speed relay, the coil 13 of which is energized by current from an oscillator 14 having a large alternating component. Hence, during ½-cycle the switch contact 8 is thrown to the right to charge the condenser, and during the reverse ½-cycle the contact 8 is thrown to the left to discharge the condenser. The moving element of the galvanometer 12 is provided with a mirror and serves to control the amount of light which is reflected from the mirror galvanometer from a light source 15 to a photoelectric cell 16. The cell 13 is a part of the control circuit of oscillator 11 and serves to control the frequency of the oscillator such that a decrease in U tube capacitance corresponding to an increase in rate of flow will produce an increase in oscillator frequency and vice versa.

In operation there is a rapid charge and discharge of the condenser by the commutating device at 8, the rate depending on the frequency of the oscillator, and the amount of condenser charging current per cycle depending upon the value of the U tube condenser and the rate of flow in conduit 3.

The galvanometer 12 is well damped and responds to the average current therethrough and not to individual, sudden changes and reversals of current that may be due to the alternate charging and discharging of the condenser. Also, the galvanometer has no restraining spring so that it will remain in any position with zero average coil current. It will now be evident that for a given rate of flow and value of U tube capacitance, the bridge can be balanced where the average current flow through the galvanometer is zero with the galvanometer armature in a given position. This will correspond to a given frequency of the oscillator and rate of operation of relay 13.

Assuming this condition to have been achieved, then an increase in the rate of flow and a decrease in the U tube capacitance will unbalance the bridge and cause a deflection of the galvanometer in a direction to increase the frequency of the oscillator. The increase in frequency, in turn, increases the rate at which the condenser is charged and discharged, and although the amount of charging current per charge has decreased, due to the smaller value of capacitance, the number of charges in a given period of time has increased. Hence, the control is in a direction to rebalance the bridge but with the galvanometer in a slightly different position. A stable control condition will be reached where the increase in oscillator frequency and rate of charging of the condenser offsets the decrease in capacitance and charging current per cycle. In case of a decrease in the rate of flow, the capacitance of the U tube condenser will increase and its charging current per cycle will increase. This will cause a deflection of the galvanometer in a direction to reduce the frequency of the oscillator and condenser charging rate until a stable operating condition is reached, where the decrease in frequency offsets the increase in capacity. Thus the frequency put out by the oscillator is inversely proportional to the U tube capacity and directly proportional to the rate of flow.

At 17 is a synchronous motor-driven counter, the motor being connected to the oscillator output terminals in parallel with the polarized relay 13. Hence, the counter serves to integrate the instantaneous rate of flow measurements and may be calibrated in gallons, for example. Several types of electronic oscillators and controls therefor suitable for use as above described are well known. A relaxation type oscillator is usually most convenient. The condenser commutating device may be operated by the synchronous motor instead of by a relay.

In Fig. 2 we have shown a pressure U tube similar to that of Fig. 1, except that both legs serve as variable condensers, and they may be connected differentially in a bridge or other control circuit so as to take advantage of the change in mercury level in both tubes with a corresponding increase in sensitivity. In Fig. 2 a four-arm bridge is shown having resistance arms 18 and 19 and variable capacitance arms 20 and 21. A galvanometer control circuit 22 is connected across the bridge, and the galvanometer may be calibrated in terms of the variable being measured by the U tube. The bridge may be supplied from either a direct or alternating current source 23.

What we claim as new and desire to secure by Letters Patent of the United States is:

1. Electrical measuring apparatus, comprising a U-tube of insulating material containing mercury and in which the mercury level in the two limbs of the tube varies with respect to each other in response to a pressure differential, a metal coating closely surrounding at least one limb of the U-tube over the range of mercury level variation, thereby forming a variable condenser in which the mercury serves as a variable plate, a bridge circuit including said variable condenser and three resistance arms, a high-speed electrically operated single pole double throw switch, which in one position connects said condenser in said bridge circuit, and in the other position interrupts said connection and short-circuits said condenser, a source of direct current supply for said bridge, a well-damped galvanometer having an unbiased movement connected across said bridge and subject to deflection by the average unbalanced condition thereof, and an oscillator the output frequency of which is varied by said galvanometer in proportion to the deflection thereof and which drives said high-speed electrically operated switch at a frequency corresponding to the oscillator frequency, said switch having a cycle of operation between its two positions per cycle output of said oscillator, said galvanometer being arranged to vary oscillator output frequency in inverse relation to changes in capacitance of said variable condenser.

2. Electrical apparatus for obtaining an integration of the instantaneous magnitudes of a variable condition, comprising a bridge circuit having four arms, a source of direct current supply for said bridge circuit, a well-damped galvanometer having an unbiased movement connected across said bridge circuit and subject to deflection by the average unbalanced condition thereof, three arms of said bridge comprising resistors and the fourth arm of said bridge comprising a condenser the capacitance of which is varied in inverse relation to instantaneous magnitudes of the quantity being measured, a commutating device for alternately connecting said condenser bridge arm in the bridge circuit and short-circuiting the condenser, an oscillator the output frequency of which is varied by said galvanometer in proportion to the deflection thereof, means energized from the output of said oscillator for driving said commutating device at a frequency corresponding to the oscillator frequency, said galvanometer being arranged to vary oscillator output frequency in inverse relation to changes in capacitance of said variable condenser and to restore said bridge to a balanced condition when it becomes unbalanced, and means for integrating the output frequency of said oscillator.

3. Electrical apparatus for measuring the magnitude of a variable condition, comprising a bridge circuit having four arms, a source of direct current supply for said bridge circuit, a well-damped galvanometer having an unbiased movement connected across said bridge circuit and subject to deflection by the average unbalanced condition thereof, three arms of said bridge comprising resistors and the fourth arm of said bridge comprising a condenser the capacitance of which is varied in inverse relation to instantaneous magnitudes of the quantity being measured, a commutating device for alternately connecting said condenser bridge arm in the bridge circuit and short-circuiting the condenser, an oscillator the output frequency of which is varied by said galvanometer in proportion to the deflection thereof, means energized from the output of said oscillator for driving said commutating device at a frequency corresponding to the oscillator frequency, said galvanometer being arranged to vary oscillator output frequency in inverse relation to changes in capacitance of said variable condenser and to restore said bridge to a balanced condition when it becomes unbalanced.

References Cited in the file of this patent

UNITED STATES PATENTS

| 2,103,741 | Bencowitz | Dec. 28, 1937 |

FOREIGN PATENTS

| 626,217 | Great Britain | July 12, 1949 |
| 895,938 | France | Apr. 17, 1944 |